(12) United States Patent
Aoyagi

(10) Patent No.: US 8,559,549 B2
(45) Date of Patent: Oct. 15, 2013

(54) BURST OSCILLATION DEVICE, BURST OSCILLATION METHOD, AND RANGING/COMMUNICATION SYSTEM

(75) Inventor: Yasushi Aoyagi, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 1105 days.

(21) Appl. No.: 12/138,552

(22) Filed: Jun. 13, 2008

(65) Prior Publication Data

US 2008/0260019 A1      Oct. 23, 2008

Related U.S. Application Data

(63) Continuation of application No. PCT/JP2007/060955, filed on May 30, 2007.

(30) Foreign Application Priority Data

Jun. 1, 2006  (JP) .................................. 2006-153313

(51) Int. Cl.
*H04L 27/00* (2006.01)

(52) U.S. Cl.
USPC .............. 375/295; 327/291; 332/106; 341/20

(58) Field of Classification Search
USPC ........................................................ 375/295
See application file for complete search history.

(56) References Cited

U.S. PATENT DOCUMENTS

| | | | |
|---|---|---|---|
| 7,420,503 B2 * | 9/2008 | Uchino | ............................ 342/70 |
| 2004/0233973 A1 * | 11/2004 | Fullerton et al. | ............... 375/130 |
| 2004/0257167 A1 | 12/2004 | Kim et al. | |
| 2006/0045177 A1 | 3/2006 | Kurashima et al. | |
| 2007/0110125 A1 | 5/2007 | Fujita et al. | |
| 2009/0091400 A1 * | 4/2009 | Orlik et al. | ..................... 332/103 |

FOREIGN PATENT DOCUMENTS

| | | |
|---|---|---|
| EP | 0 752 778 A1 | 1/1997 |
| EP | 1 494 043 A2 | 1/2005 |
| JP | 10-224192 A | 8/1998 |
| JP | 2003-174368 A | 6/2003 |
| JP | 2005-12745 A | 1/2005 |
| JP | 2005-24563 A | 1/2005 |
| JP | 2006-094456 A | 4/2006 |
| WO | WO 2004/071039 A1 | 8/2004 |
| WO | WO 2006/054405 A1 | 5/2006 |

OTHER PUBLICATIONS

T. Teshirogi, et al., "Residual-carrier-free burst oscillator for automotive UWB radar applications", Electronics Letters, vol. 41, No. 9, Apr. 28, 2005, pp. 535-536.

* cited by examiner

*Primary Examiner* — Shuwang Liu
*Assistant Examiner* — Gina McKie
(74) *Attorney, Agent, or Firm* — Oblon, Spivak, McClelland, Maier & Neustadt, L.L.P.

(57) ABSTRACT

The burst oscillation device 20 includes the data generation part 21, the operation part 11, the signal selecting part 40 and the burst generation part 50. The generation part 21 outputs the encoded data encoded based on data for communication. At the signal selecting part 40, the pulse release timing of predetermined repetition period is randomly delayed by the PPM and further delayed randomly by the minimal time by means of the PSK modulation, thereby realizing the decreasing of the peak value of the average power spectral density.

19 Claims, 4 Drawing Sheets

BURST OSCILLATION DEVICE, BURST OSCILLATION METHOD, AND RANGING/COMMUNICATION SYSTEM

TECHNICAL FIELD

The present invention relates to a burst oscillation device, a burst oscillation method, and a ranging/communication system.

BACKGROUND ART

There has been disclosed many technologies of a range measurement using a radio wave, that is to say a radar function. For example, a radar which uses monotonically repeated transmitted pulses or the like is well known as a ranging function. Moreover, as a new concept wireless communication technology in recent years, attention is focused on a UWB (Ultra Wide-Band) wireless system, which is an ultra wideband wireless system utilizing a band of several GHz. And then an application using the technology has been examined not only for a communication but also for a range measurement or the like.

In the UWB wireless system, since one equipment utilizes a frequency band over several GHz, it is necessary to decrease a giving of interference to existing narrowband systems such as a fixed wireless network, a global surveillance system, and the like. Regarding an index to decrease the giving of interference, a regulation for a peak value of an average power spectral density has been examined. That is to say, the regulation, or a spectrum mask, is such that a maximum value of the average power spectrum in terms of an equivalent isotropically radiated power (EIRP) measured with a 1 MHz resolution should not exceed −41 dBm/MHz within a predetermined frequency band, for example, within a frequency range of 24 GHz to 29 GHz.

In a case of transmitting pulses with a predetermined repetition period, line spectrums occur in the average power spectral density with an interval of 1/(pulse repetition period). In order to decrease the maximum value of the average power spectral density so as not to be over the above mentioned spectrum mask, it is necessary to decrease the peak value of these line spectrums. A scrambling process is effective for this purpose, in which the pulse repetition period is randomized.

Regarding the regulation for the average power spectral density, since a spectrum observation is performed for a predetermined UWB band with a 1 MHz unit, a case of the repetition period being above 1 μs (below 1 MHz) does not make any sense in decreasing the average power spectral density. Moreover, regarding the average power spectral density, an average value observed during several tens of milliseconds is considered. Thus the peak value of the line spectrum may become higher as the pulse repetition period is made shorter (or as the repetition frequency is made higher).

Meanwhile, in a case of a short-range radar (SRR) for vehicles, a lower limit is set for the pulse repetition period. That is to say, because the ranging of approximately 30 (m) is required for the short-range radar for vehicles, it is necessary to determine the pulse repetition period so as not to output two or more pulses within the back-and-forth time of a single pulse. For example, assuming a light speed as $3 \times 10^8$ (m/s), a transmitting interval of the pulse should not shorter than the lowest period Tmin which is defined as the following Equation 1.

$$T\text{min} = 30 \text{ (m)} \times 2/(3 \times 10^8) \quad \text{(Equation 1)}$$
$$= 200 \text{ (ns) } [PRF: 5 \text{ (MHz)}].$$

Here, the second term "2" in the right-hand side expresses the back-and-forth traveling.

Thus, in the short-range radar for vehicles, it is necessary to determine the pulse repetition period within a range between 200 ns and 1 μs.

In the Patent Document 1 (see below), as the UWB wireless system, the short-range radar for vehicle configured to monitor the surrounding area of the vehicle is disclosed. A technology to perform the range measurement using one short-range radar is described herein. In order to decrease the maximum value of the above mentioned average power spectral density, the Patent Document 1 proposes a method which applies a scrambling process to the pulse repetition period by a programmable jittering device. The scrambling process has an effect to decrease a peak value of a line spectrum in an average transmit power spectral density.

Moreover, the device that simultaneously realizes a ranging function and a communicating function is being developed. For example, the Patent Document 2 (see below) discloses that both functions are realized in one device. According to the Patent Document 2, in performing data communication using a UWB wireless communication device, a communication range is predetermined using the ranging function and then a transmitting output power is determined based thereon, in order to avoid an interference with other wireless communication and the like.

Furthermore, regarding a method for obtaining a high frequency signal of the wireless communication, two methods are considered. One is the method called the direct modulation method, which directly modulates a high frequency signal by the data signal. The other is called the heterodyne method, which modulates a lower frequency using the data signal and further frequency-modulates the modulated frequency so as to obtain a necessary high frequency signal. Comparing the two methods, the direct modulation method has an advantage from the viewpoint of a circuit scale, cost performance, and the like. In executing the direct modulation method, the pulse signal is up-converted to a preferable high frequency band by a high frequency carrier wave generated by a continuous-wave oscillator. Hence, an unmodulated carrier continually appears due to the local leak, which causes a problem of deterioration of an on/off ratio of the pulse. Moreover, when modulated in a wide band, the line spectrum of the local leakage signal is more intense than the modulated signal, causing another problem of incompliance with the spectrum condition of the regulation. Therefore, a burst oscillator shown in the Non-patent Document 1 (see below) has been proposed.

In the burst oscillator of the Non-patent Document 1, a high frequency oscillator is switched on during a predetermined period only, based on a trigger signal, so as to directly obtain an RF signal of short period.

Patent Document 1 Japanese Patent Application Publication No. 2005-24563

Patent Document 2 Japanese Patent Application Publication No. 2003-174368

Nonpatent Document 1 T. Teshirogi, S. Saito, M. Uchino, M. Ejima, K. Hamaguchi, H. Ogawa and R. Kohno, "A residual-carrier-free burst oscillator for automotive UWB radar applications," Electronics Letters, Vol. 41, No. 9, pp. 535-536, April 2005.

DISCLOSURE OF THE INVENTION

Problems to be Solved by the Invention

However, in the above mentioned conventional arts, there are the following problems. In the short-range radar for vehicles described in the Patent Document 1, the pulse generated with a fixed repetition period is delayed using a program, and a scrambling process is performed thereby. However, adding the delay to the pulse generated with the fixed repetition period by the program is not sufficient to decrease a peak of an average power spectral density.

Moreover, in the above mentioned conventional arts, a spread effect of a line spectrum by a random jittering has been investigated, in which a pulse release timing is randomized with an interval of 200 ns to 300 ns based on a preferable range on the pulse repetition period of the short-range radar for vehicles. However, in such a range, sufficient spread effect cannot be obtained.

Furthermore, when adding a delay for randomization, the line spectrums occur with a frequency interval determined by the minimum value of the delay amount. In this case, since this line spectrums occur in high level of the average power spectral density, the decreasing effect of the average power spectral density is not sufficient.

Moreover, regarding the short-range radar for vehicles, it is necessary to efficiently collect information on existence or nonexistence of an object around a vehicle, and thus it is required that plural radars are equipped in one vehicle and operated simultaneously. In this case, it is necessary not to generate a radio wave interference among the radars equipped in the vehicle. However, in the case of using the short-range radar described in the Patent Document 1, the number of radars to be operated simultaneously in one vehicle cannot be increased due to the generation of the radio wave interference.

On the other hand, regarding a conventional equipment to simultaneously realize a ranging function and a communicating function, a device having the ranging function and another device having the communicating function are separately equipped and are combined together. Alternatively, devices having both functions are integrated, however, both functions are not available at the same time but used by switching (refer to the Patent Document 2). Hence, there is a problem that it is hard to downsize and lighten the equipment. Moreover, because both functions are not able to be used simultaneously, a sophisticated way of utilization, such as recognizing a movement of the other party of communication during the communication, is not able to be realized.

Furthermore, in the Non-patent Document 1, no investigation is done on a high-level utilization mode to decrease the power spectral density.

Here, the present invention is presented for solving the above-mentioned problems. Specifically, the present invention provides a sophisticated burst oscillation device, a burst oscillation method, and a ranging/communication system, capable of decreasing the average power spectral density and of simultaneously processing both ranging and communication.

Means for Solving the Problem

A first aspect of a burst oscillation device of the present invention is a burst oscillation device comprising:
  a data generation part;
  an operation part configured to generate a trigger signal with a predetermined repetition period;
  a modulation signal generating part configured to receive data from the data generation part, generate a first delay time signal corresponding to a first delay time having a time length calculated by multiplying a predetermined minimum delay time by an integer determined based on the data, and generate a second delay selection signal indicating whether or not to apply a second delay time having a time length shorter than the predetermined minimum delay time based on the data;
  a pulse position modulating (PPM) part configured to receive the first delay time signal and the trigger signal from the modulation signal generating part and the operation part respectively, and release the trigger signal at a release timing delayed by the first delay time based on the first delay time signal;
  a phase shift keying (PSK) part configured to receive the second delay selection signal and the trigger signal from the modulation signal generating part and the PPM part respectively, and adjust the release timing of the trigger signal by selecting whether or not to apply the second delay time to the release timing of the trigger signal based on the second delay selection signal; and
  a burst generation part including an oscillator and configured to receive the trigger signal from the PSK part and output a burst signal by making the oscillator to oscillate based on the trigger signal.

Another aspect of the burst oscillation device of the present invention is characterized in that the above-mentioned second delay time is approximately equal to one half of a period corresponding to a natural frequency of the oscillator.

Still another aspect of the burst oscillation device of the present invention is characterized in that the above-mentioned PSK part includes a minimal time delaying part which applies the second delay time.

Still another aspect of the burst oscillation device of the present invention is characterized in that the above-mentioned burst generation part includes a plurality of the above-mentioned oscillators having different natural frequencies,
  a plurality of the above-mentioned PSK parts are provided to correspond to the oscillators, and
  each minimal time delaying part provided in the PSK parts is configured to apply the second delay time approximately equal to one half of the period corresponding to the natural frequency of the corresponding oscillator.

Still another aspect of the burst oscillation device of the present invention is characterized in that the above-mentioned modulation signal generating part further generates a frequency selection signal based on the above-mentioned data, in addition to the above-mentioned first delay time signal and the above-mentioned second delay selection signal, and
  any one of the above-mentioned oscillators is selected based on the above-mentioned frequency selection signal and the above-mentioned trigger signal is input to the selected oscillator so that the selected oscillator oscillates.

Still another aspect of the burst oscillation device of the present invention is characterized in that the above-mentioned oscillator oscillates only for a duration of 500 ps to 3 ns on receiving the above-mentioned trigger signal.

Still another aspect of the burst oscillation device of the present invention is characterized in that the above-mentioned oscillator has the natural frequency of 24 GHz to 29 GHz.

Still another aspect of the burst oscillation device of the present invention is characterized in that the above-mentioned minimum delay time is not less than 10 ns and less than 100 ns.

Still another aspect of the burst oscillation device of the present invention is characterized in that the above-mentioned data generation part outputs data for communication.

Still another aspect of the burst oscillation device of the present invention is characterized in that the above-mentioned data generation part outputs pseudorandom number sequence.

A first aspect of a ranging/communication system of the present invention is a ranging/communication system comprising:
  the burst oscillation device according to any one of the above-mentioned aspects;
  a transmitting antenna for transmitting the burst signal output from the burst oscillation device;
  a receiving antenna; and
  a receive processing part for receiving a received signal received by the receiving antenna and for performing a predetermined process.

Another aspect of the ranging/communication system of the present invention is characterized in that the above-mentioned receive processing part includes a ranging part and a communication part, and
  the ranging part and the communication part are operated in parallel.

A first aspect of a burst oscillation method of the present invention is a burst oscillation method comprising:
  generating a first delay time signal corresponding to a first delay time having a time length calculated by multiplying a predetermined minimum delay time by an integer determined based on an input data, and generating a second delay selection signal indicating whether or not to apply a second delay time having a time length shorter than the predetermined minimum delay time based on the input data;
  pulse position modulating a trigger signal by controlling a release timing of the trigger signal based on the first delay time signal;
  phase shift keying (PSK) modulating the release timing of the pulse position modulated trigger signal based on the second delay selection signal; and
  outputting a burst signal by oscillating an oscillator based on the PSK modulated trigger signal, the burst signal having a natural frequency of the oscillator as a center frequency thereof.

Another aspect of the burst oscillation method of the present invention is characterized in that the above-mentioned second delay time is approximately equal to one half of a period corresponding to the natural frequency of the oscillator.

Still another aspect of the burst oscillation method of the present invention is characterized in that the method further comprises:
  generating a frequency selection signal based on the above-mentioned input data;
  selecting any one of at least two different frequencies based on the frequency selection signal; and
  outputting the burst signal having the selected frequency as the center frequency thereof.

Effects of the Invention

According to the present invention, it becomes possible to provide a sophisticated burst oscillation device and method capable of decreasing the average power spectral density by applying a predetermined scramble processing to the repetition frequency of the pulse. Moreover, according to the present invention, it becomes possible to provide a ranging/communication system capable of processing the ranging and the communication in parallel.

BRIEF DESCRIPTION OF REFERENCES SYMBOLS

Figure 1:
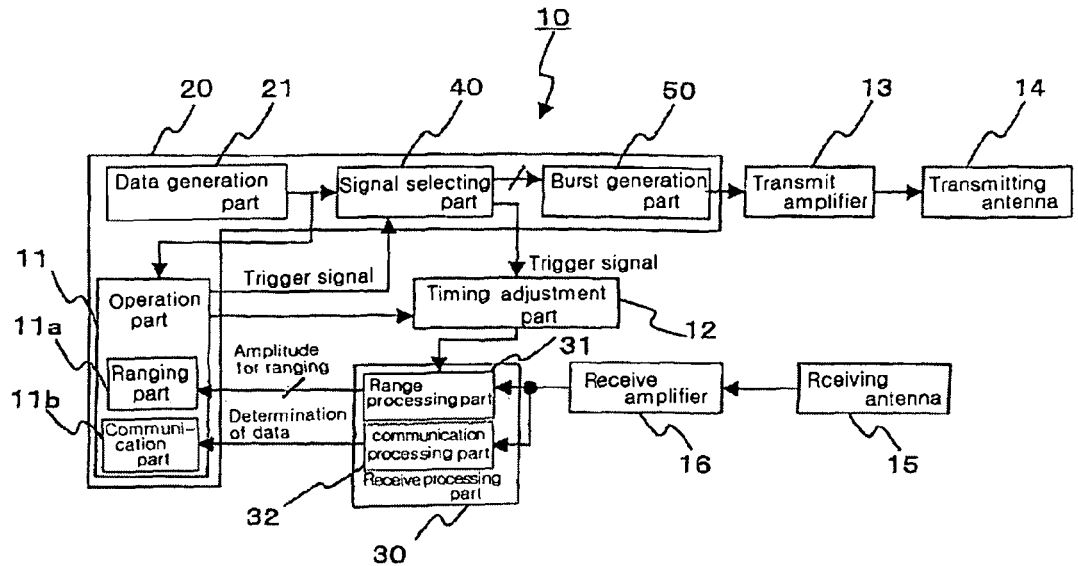
FIG. 1 is a block diagram showing a structure of the ranging/communication system according to an embodiment of the present invention.

10, 60 Ranging/communication system
11 Operation part
11a Ranging part
11b Communication part
12 Timing adjustment part
13 Transmit amplifier
14 Transmitting antenna
15 Receiving antenna
16 Receive amplifier
20 Burst oscillation device
30 Receive processing part
31 Range processing part
32 Communication processing part
33 Filters
34, 36 Detectors
35 AD converters
37 Comparator
40 Signal selecting part
41 Modulation signal generating part
42 PPM part
43 PSK part
44 Frequency selecting part
45 Minimal time delaying part
46 Switching part
50 Burst generation part
51 Oscillators
52 Oscillation controlling part
53 RF synthesizer
61 Frequency selection switch

BEST MODE FOR CARRYING OUT THE INVENTION

A burst oscillation device, a burst oscillation method, and a ranging/communication system of the preferred embodiments will be described in detail, with reference to the drawings. Here, each component part having the similar function is designated by the same symbol for simplifying the drawings and the description.

The burst oscillation device of the present invention is configured to oscillate a high frequency burst signal having a duration of 500 ps to 3 ns and perform a preferable scramble processing to satisfy a regulation (a spectrum mask) for a peak value of an average power spectral density. Furthermore, the ranging/communication system using the burst oscillation device of the present invention is configured to be able to perform a ranging and a communication in parallel by superimposing data on a generating timing of the burst.

In a case of using the burst oscillation device of the present invention as a short-range radar (SRR) for vehicle, the pulse repetition period needs to be examined in a range between 200 ns (5 MHz) and 1 μs (1 MHz). The burst oscillation device of the present invention can realize the decrease of the average power spectral density by performing a pulse position modulating (PPM) and the like in the repetition period of the above mentioned range, in which the decreasing effect of the peak value of the average power spectral density can be expected. In the above mentioned pulse repetition period, it becomes possible to set a lower peak power of a transmitted impulse, making it possible to reduce costs of high frequency components.

FIG. 1 is a block diagram showing a structure of the ranging/communication system according to one embodiment of the present invention. The ranging/communication system 10 of the present embodiment includes a burst oscillation device 20, a timing adjustment 12, a transmit amplifier 13, a transmitting antenna 14, a receiving antenna 15, a receive amplifier 16 and a receive processing part 30. The ranging/communication system 10 is equipped in a vehicle and is configured to perform in parallel both the measurement of a distance (ranging) between the system 10 and the other party of communication, and the communication therebetween.

The burst oscillation device 20 includes a data generation part 21, the operation part 11, a signal selecting part 40 and a burst generation part 50. The ranging/communication system 10 of the present embodiment is configured to perform the ranging and the communication in parallel. From the data generation part 21, encoded data is output, which is encoded based on the data for communication. As another embodiment of the present invention, in the case where a system performs a ranging only, the data generation part 21 can be configured to output pseudorandom number sequence.

Figure 2:
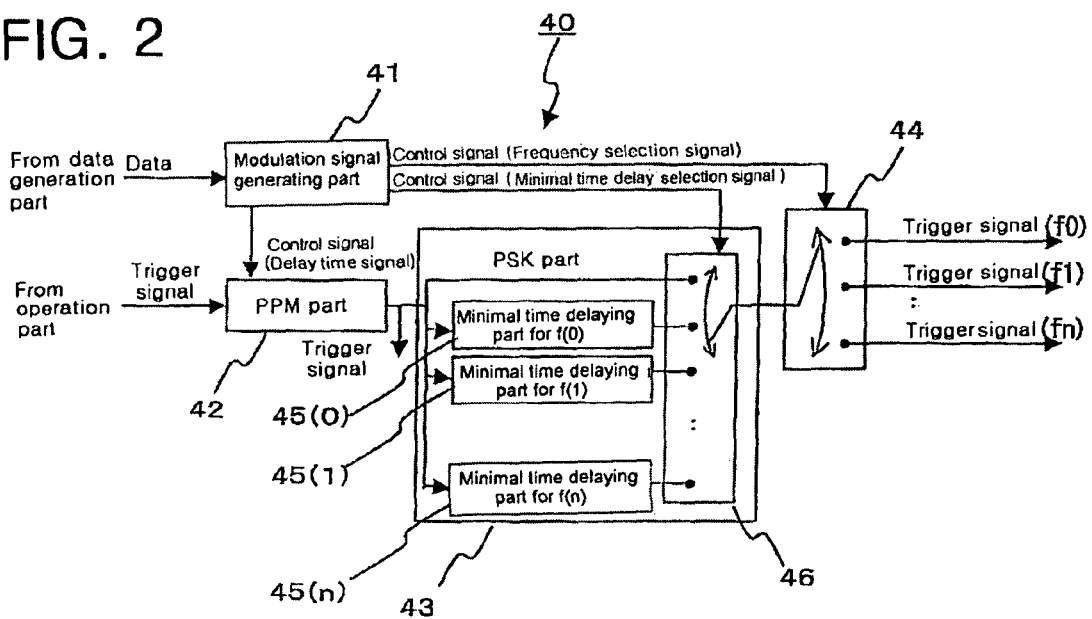
FIG. 2 is a block diagram showing a structure of the signal selecting part.

A configuration of the signal selecting part 40 is described below using the block diagram shown in FIG. 2. The signal selecting part 40 includes a modulation signal generating part 41, a PPM part 42, a PSK part 43 and a frequency selecting part 44. The modulation signal generating part 41 is configured to generate a modulation signal based on the encoded data which is input from the data generation part 21. This modulation signal is composed of a delay time signal as a control signal for the PPM part 42, a minimal time delay selection signal as the control signal for the PSK part 43, and a frequency selection signal as the control signal for the frequency selecting part 44.

The PPM part 42 is configured to receive a trigger signal from the operation part 11 at a pulse generating timing of every predetermined repetition period, and also receive a delay time signal as one of a modulation signal from the modulation signal generating part 41. And then the PPM part 42 releases the trigger signal delayed by the delay time relative to the predetermined repetition period. This delay time is calculated at the modulation signal generating part 41 by multiplying a predetermined minimum delay time by an integer which is determined using the encoded data. Preferably, the predetermined minimum delay time may be set as approximately several tens of nanoseconds in a range not less than 10 ns and less than 100 ns.

Since the delay time added to the release timing of the trigger signal in the PPM part 42 is calculated based on the encoded data which is output from the data generation part 21, the time length is expected to be random. Thus, the release timing of the trigger signals of the predetermined repetition period are randomly delayed, making it possible to decrease peak values of line spectrums which appear with a frequency interval of 1/(the repetition period) in the average power spectral density. Note that although other line spectrums also appear with a frequency interval of 1/(the minimum delay time), these are also decreased from the initial peak value.

The PSK part 43 is configured to receive the trigger signal released from the PPM part 42, and also receive an minimal time delay selection signal as another modulation signal from the modulation signal generating part 41. In the case of this minimal time delay selection signal being on, the PSK part 43 releases the trigger signal so that the pulse generating timing is further delayed by a predetermined minimal delay time, which is shorter than the above-described predetermined minimum delay time added at the PPM part 42. The PSK part 43 includes minimal time delaying parts 45($i$) each corresponding to the oscillator of natural frequency (fi) equipped in the burst generation part 50, described hereinafter in detail. In a case of the minimal time delay selection signal being on, the PSK part 43 switches a switching part 46 to the lower side in FIG. 2 to select the trigger signal going though one of the minimal time delaying parts 45($i$), so that the trigger signal delayed by the predetermined minimal time is released. For realizing the delay of the above mentioned minimal time, the minimal time delaying parts 45($i$) may be formed by a delaying path having a predetermined length.

The above mentioned minimal time may preferably be set at an approximate half of a period (1/fi) corresponding to the natural frequency (fi) of the oscillator. For example, when the natural frequency of the oscillator is 25 GHz, the minimal time may be set at approximately 20 ps. The pulse signal released from the burst oscillation device 20 has a pulse width of approximately 1 ns which is approximately 50 times longer than the minimal time, so that it is possible to realize a PSK modulation by using the PSK part 43 capable of a phase change by the timing of the trigger signal.

Moreover, since the minimal time delay selection signal is set to be on/off based on the encoded signal which is output from the data generation part 21, the minimal time delay selection signal is also set to be random. As a result, the PSK part 43 is able to perform randomly the minimal time delaying of the release timing of the trigger signal. This makes it possible to further spread the line spectrums, which have appeared due to the processing in the PPM part 42 based on the delay time of approximately several tens of nanoseconds, and makes it possible to further decrease the peak value of the average power spectral density. As described above, each spread spectrum effect of the PPM and the PSK can be performed by controlling the delay amount of one signal, i.e. the trigger signal.

The frequency selecting part 44 is configured to receive a frequency selection signal as a further different modulation signal from the modulation signal generating part 41, and also receive the trigger signal from the PSK part 43. And then, the frequency selecting part 44 selects an output path to the burst generation part 50 so that the trigger signal is input to one oscillator having a natural frequency selected based on the frequency selection signal. Thus, the frequency selecting part 44 realizes an FSK (Frequency Shift Keying) modulation to discretely change the frequency of an oscillating pulse based on the encoded data. In the present embodiment, the frequency selecting part 44 is provided in the signal selecting part 40, and one oscillator is selected therein so as to output the trigger signal to the burst generation part 50, although alternatively the selection of oscillator may be performed in the burst generation part 50.

Figure 3:
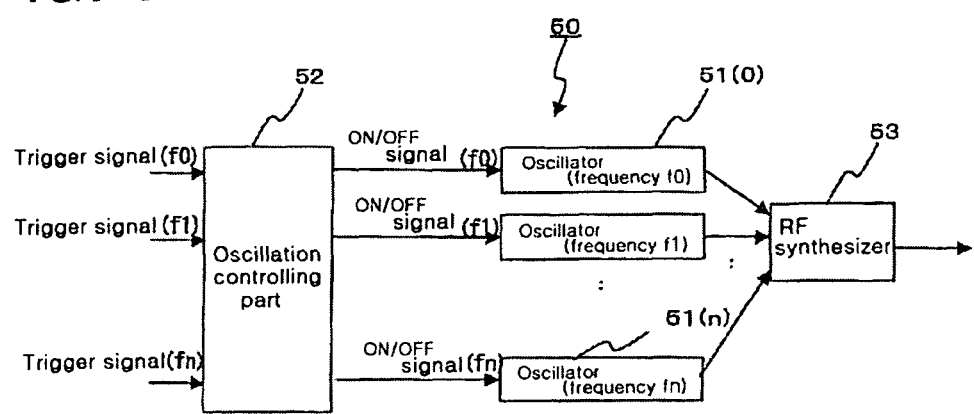
FIG. 3 is a block diagram showing a structure of the burst generation part.

A configuration of the burst generation part 50 is described using a block diagram shown in FIG. 3. The burst generation part 50 includes a plurality of oscillators 51 having different natural frequencies for each (e.g. the oscillator 51(*i*) has the natural frequency (fi)), and the oscillation of the oscillators 51 are controlled by an oscillation controlling part 52. The oscillation controlling part 52 is configured to receive a trigger signal for each of the oscillators 51 from the signal selecting part 40, and make the corresponding oscillator 51 to oscillate directly for only a predetermined duration when detecting a rising edge (or a falling edge) of any trigger signal. The predetermined duration to oscillate each oscillator 51 is approximately between 500 ps and 3 ns, and then, by making the corresponding oscillator 51 to power on during only this period, a high frequency burst signal having a duration of 500 ps to 3 ns is released. As described above, the pulse released from the burst generation part 50 is an FM (frequency modulated) pulse. The FM pulse is output from an RF synthesizer 53 to the transmit amplifier 13, amplified by the transmit amplifier 13, and then transmitted from the transmitting antenna 14 to outside.

The natural frequencies (f0) to (fn) of the respective oscillators 51(0) to 51(*n*) are, in conformity with a spectrum mask regulation of UWB, able to be set within a range of 24 GHz to 29 GHz for example. By oscillating pulses of different center frequencies (f0) to (fn) within this range, it is possible to effectively utilize the above mentioned frequency band. Moreover, because of releasing pulses of different center frequencies, being free from a restriction in the time domain, it becomes possible to transmit impulses with a frequency beyond 5 MHz, even when measuring within a range of 30 meters. This makes it possible to decrease the interference inside the system itself and increase the number of the radars to be operated at the same time.

As above described, according to the present invention, the average power spectral density is randomly spread over a wide frequency band by the PPM based on the encoded data, thereby obtaining the effect to decrease the peak power. Therefore, the burst oscillation device of the present invention can provide a pulse oscillation means usable for the UWB wireless involving a stringent spectrum mask regulation. Moreover, according to the ranging/communication system of the present invention, by scrambling the impulse while transmitting the data by means of the PPM method, it becomes possible to prevent the interference with other radar sensors and the like.

In the above described embodiment, by performing the PSK modulating and the FSK modulating in addition to the PPM, the effect of further decreasing the peak power of the average power spectral density is obtained. Moreover, it becomes possible to avoid the interference with another radar sensor inside a vehicle and to decrease the interference with other existing systems, while satisfying the spectrum mask regulation.

Next, a processing at a receiver side will be explained using a block diagram shown in FIG. 1. A pulse signal received by a receiving antenna 15 is amplified by a receive amplifier 16, and then the amplified signal is transmitted to a receive processing part 30. The receive processing part 30 is configured to be able to perform a signal processing for ranging and another signal processing for communication in parallel, on the received pulse signal. Regarding the signal processing for ranging, it is necessary to properly determine a start timing of the processing and the like. Therefore, a signal for determining the start timing is input to the receive processing part 30 from a timing adjustment part 12.

The timing adjustment part 12 is configured to receive the trigger signal of which the release timing was adjusted by the PPM part 42 of the signal selecting part 40, in accordance with a control signal from the operation part 11. And then, the timing adjustment part 12 outputs a clock signal for making the receive processing part 30 perform sampling of the received pulse using this trigger signal as a trigger. A start timing of this sampling of each natural frequency ((f0) to (fn)) of the oscillators 51 is determined. The receive processing part 30 is configured to receive the above mentioned clock signal from the timing adjustment part 12 and perform the signal processing for ranging in accordance with the clock signal.

Figure 4:
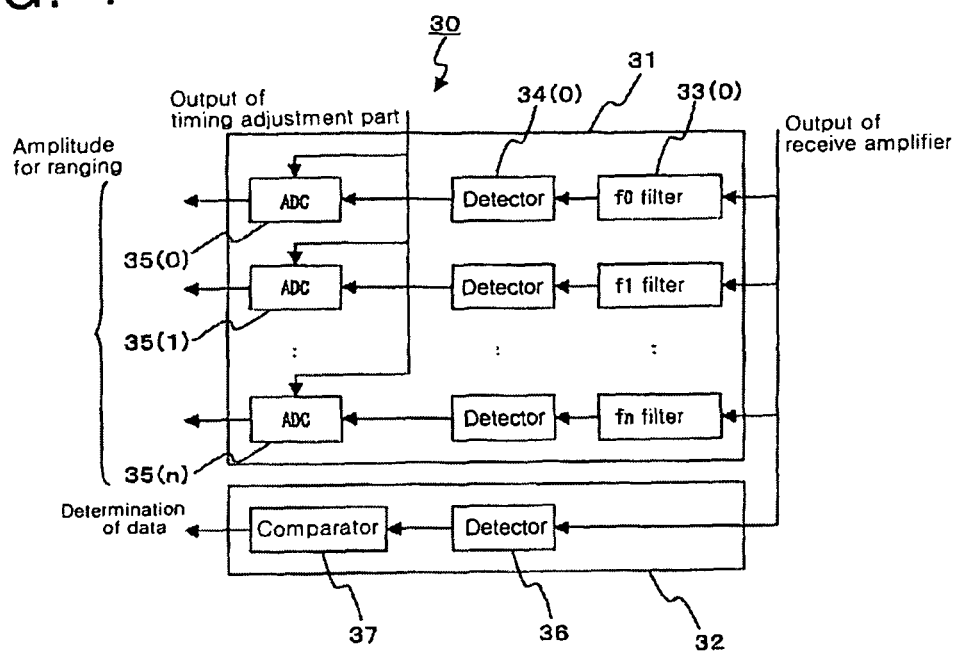
FIG. 4 is a block diagram showing a structure of the receive processing part.

A configuration of the receive processing part 30 will be described, using a block diagram shown in FIG. 4. The receive processing part 30 is composed of a range processing part 31 and a communication processing part 32. The range processing part 31 is equipped with an f0 filter 33(0) to an fn filter 33(*n*), detectors 34(0) to 34(*n*), and AD converters (ADC) 35(0) to 35(*n*), which are provided to correspond to the frequencies (f0) to (fn). The communication processing part 32 is equipped with a detector 36 and a comparator 37.

In the range processing part 31, an output signal from the receive amplifier 16 is passed through the f0 filter 33(0) to the fn filter 33(*n*) to extract a power spectrum of each frequency band, and then each output is detected by the detector 34(0) to 34(*n*). When a center frequency of the received pulse is the frequency (fi), a pulse wave thereof is detected by the detector 34(*i*), whereas no other pulse waves are detected by other detectors. Each detected signal detected by the detectors 34(0) to 34(*n*) is output to the corresponding AD converter 35(0) to 35(*n*), digitized therein and transmitted to a ranging part 11*a* equipped in the operation part 11. Note that the number of the AD converters 35 can be decreased by inserting a multiplexer between the AD converter 35 and the detectors 34.

In the processing on the respective AD converters 35(0) to 35(*n*), a clock signal for performing each sampling is input from the timing adjustment part 12, and in accordance with this clock signal, the sampling is performed by AD converting the signal from the corresponding detector 34. Thus, the ranging part 11*a* in the operation part 11 comes to know a time between the transmittance and reception of the pulse signal, thereby enabling calculation of the distance to the object.

Meanwhile in the communication processing part 32, a received signal is detected by the detector 36 regardless of the frequency thereof. Then, the detected signal is output to the comparator 37, and a determination of data is performed therein. The comparator 37 is a passive response comparator, and is capable of detecting an existence or nonexistence of a signal all over the frequency band. The comparator 37 compares the signal detected by the detector 36 with a predetermined reference value and performs the data determination of, for example, "0" or "1", based on the comparison result. And then the result of the determination is output to the communication part 11*b* equipped in the operation part 11. By using the comparator 37, a demodulation of the pulse position modulated encoded data can be realized.

As described above, the receive processing part 30 is equipped with the range processing part 31 and the communication processing part 32, making it possible to perform the ranging and the communication in parallel. Thus, there can be provided a ranging/communication system capable of integrally processing the ranging function and a communication function. Moreover, it becomes possible to detect the other party of communication by means of the ranging function and to simultaneously start the communication with the detected other party. Furthermore, according to the present invention, even when the other party of communication moves, it is possible to detect immediately the movement of the other party by the ranging function, and to process properly the communication as well.

Figure 5:
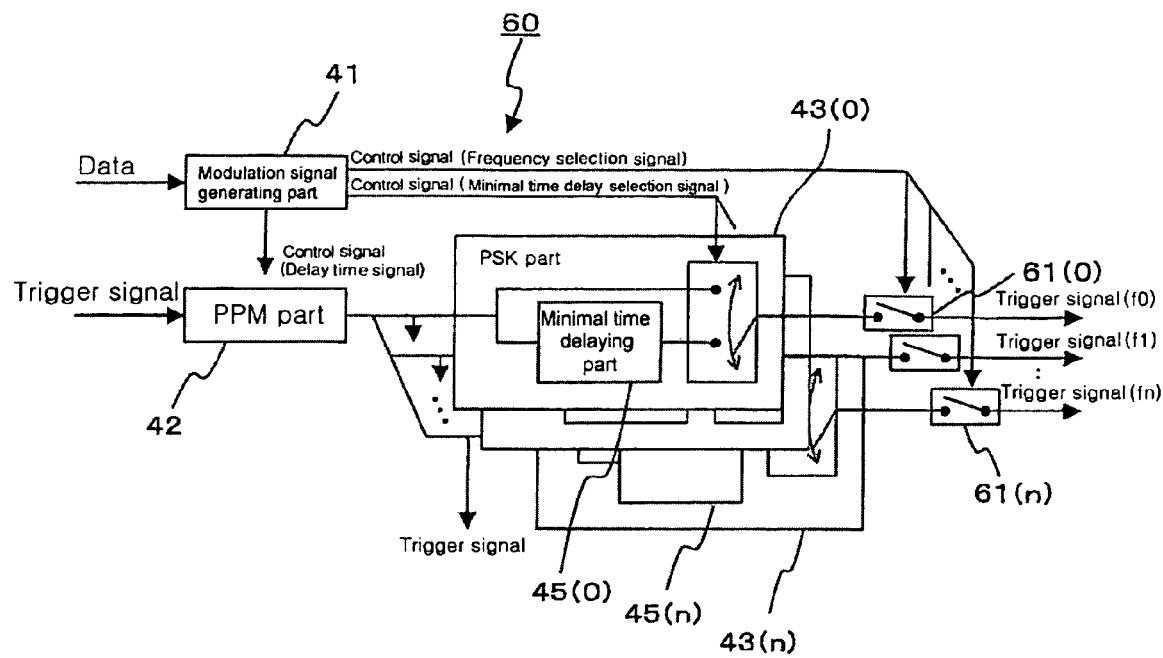
FIG. 5 is a block diagram showing a structure of the ranging/communication system according to another embodiment of the present invention.

Another embodiment of the burst oscillation device according to the present invention will be described below, using FIG. 5. The burst oscillation device 60 of the present embodiment includes PSK parts 43(0) to 43(n) which are provided to correspond to the frequencies (f0) to (fn). An output signal of each PSK part 43 is output to the oscillation controlling part 52 shown in FIG. 3. Moreover, minimal time delaying parts 45(0) to 45(n) are provided to correspond to the PSK parts 43(0) to 43(n) and respectively include a delaying line path which has a delay of approximately half of a period corresponding to the each natural frequency.

The burst oscillation device 60 further includes frequency selection switches 61(0) to 61(n) at an output side of the PSK part 43. The frequency selection switches 61 are also provided to correspond to each PSK part 43(0) to 43(n), and are configured to be able to independently turn a trigger signal on or off towards respective oscillators 51(0) to 51(n). This also makes it possible to oscillate two or more oscillators 51 at the same time.

Even in the case of oscillating two or more oscillators 51 at the same time, because the natural frequencies thereof are different and because the average power spectral density is decreased, it is possible to decrease not only a giving of interference to other system occupying the similar frequency band, but also the interference inside the system itself. As a result, it becomes possible to increase the number of radars being operatable simultaneously.

Additionally, the description regarding the present embodiments is to describe one example on the burst oscillation device, the burst oscillation method, and the ranging/communication system of the present invention, thus the present invention is not limited thereto. Furthermore, any modifications can be made to detailed configurations and operations of the burst oscillation device, the burst oscillation method, and the ranging/communication system in the above-described embodiments without departing from the subject of the present invention.

The invention claimed is:

1. A burst oscillation device comprising:
   a data generation part;
   an operation part configured to generate a trigger signal with a predetermined repetition period;
   a modulation signal generating part configured to receive data from the data generation part, generate a first delay time signal corresponding to a first delay time having a time length calculated by multiplying a predetermined minimum delay time by an integer determined based on the data, and generate a second delay selection signal indicating whether or not to apply a second delay time having a time length shorter than the predetermined minimum delay time based on the data;
   a pulse position modulating (PPM) part configured to receive the first delay time signal and the trigger signal from the modulation signal generating part and the operation part respectively, and release the trigger signal at a release timing delayed by the first delay time based on the first delay time signal to output a PPM modulated trigger signal;
   a phase shift keying (PSK) part configured to receive the second delay selection signal and the PPM modulated trigger signal from the modulation signal generating part and the PPM part respectively, and adjust the release timing of the PPM modulated trigger signal by selecting whether or not to apply the second delay time to the release timing of the PPM modulated trigger signal based on the second delay selection signal to output a PSK modulated trigger signal; and
   a burst generation part including an oscillator and configured to receive the PSK modulated trigger signal from the PSK part and output a burst signal by making the oscillator to oscillate based on the PSK modulated trigger signal.

2. The burst oscillation device of claim 1, wherein the second delay time is approximately equal to one half of a period corresponding to a natural frequency of the oscillator.

3. The burst oscillation device of claim 1, wherein the PSK part includes a minimal time delaying part which applies the second delay time.

4. The burst oscillation device of claim 3,
   wherein the burst generation part includes a plurality of the oscillators having different natural frequencies,
   a plurality of the PSK parts are provided to correspond to the oscillators, and
   each minimal time delaying part provided in the PSK parts is configured to apply the second delay time approximately equal to one half of the period corresponding to the natural frequency of the corresponding oscillator.

5. The burst oscillation device of claim 4,
   wherein the modulation signal generating part further generates a frequency selection signal based on the data, in addition to the first delay time signal and the second delay selection signal, and
   any one of the oscillators is selected based on the frequency selection signal and the trigger signal is input to the selected oscillator so that the selected oscillator oscillates.

6. The burst oscillation device of claim 2, wherein the oscillator oscillates only for a duration of 500 ps to 3 ns on receiving the trigger signal.

7. The burst oscillation device of claim 6, wherein the oscillator has the natural frequency of 24 GHz to 29 GHz.

8. The burst oscillation device of claim 6, wherein the minimum delay time is not less than 10 ns and less than 100 ns.

9. The burst oscillation device of claim 1, wherein the data generation part outputs data for communication.

10. The burst oscillation device of claim 1, wherein the data generation part outputs pseudorandom number sequence.

11. A ranging/communication system comprising:
    the burst oscillation device of claim 1;
    a transmitting antenna for transmitting the burst signal output from the burst oscillation device;
    a receiving antenna; and
    a receive processing part for receiving a received signal received by the receiving antenna and for performing a predetermined process.

12. The ranging/communication system of claim 11,
    wherein the receive processing part includes a ranging part and a communication part, and
    the ranging part and the communication part are operated in parallel.

13. A burst oscillation method comprising:
    generating a trigger signal with a predetermined repetition period;
    generating a first delay time signal corresponding to a first delay time having a time length calculated by multiplying a predetermined minimum delay time by an integer determined based on an input data, and generating a second delay selection signal indicating whether or not to apply a second delay time having a time length shorter than the predetermined minimum delay time based on the input data;

pulse position modulating (PPM) the trigger signal by releasing the trigger signal at a release timing delayed by the first delay time based on the first delay time signal;

phase shift keying (PSK) modulating the PPM modulated trigger signal by adjusting the release timing of the PPM modulated trigger signal by selecting whether or not to apply the second delay time to the release timing of the PPM modulated trigger signal based on the second delay selection signal; and outputting a burst signal by oscillating an oscillator based on the PSK modulated trigger signal, the burst signal having a natural frequency of the oscillator as a center frequency thereof.

14. The burst oscillation method of claim 13, wherein the second delay time is approximately equal to one half of a period corresponding to the natural frequency of the oscillator.

15. The burst oscillation method of claim 13, further comprising:

generating a frequency selection signal based on the input data;

selecting any one of at least two different frequencies based on the frequency selection signal; and outputting the burst signal having the selected frequency as the center frequency thereof.

16. The burst oscillation device of claim 1, wherein the second delay selection signal randomly indicates whether or not to apply the second delay time.

17. The burst oscillation device of claim 1, wherein the time length corresponding to the first delay time is randomly calculated by multiplying the predetermined minimum delay time by an integer determined based on the data.

18. The burst oscillation device of claim 1, wherein the burst signal output by the burst generation part has a pulse width that is approximately fifty times longer than the second delay time.

19. The burst oscillation device of claim 1, wherein the modulation signal generating part is configured to generate the second delay selection signal independent from generating the first delay time signal.

* * * * *